United States Patent [19]

Rearwin et al.

[11] 3,845,412

[45] Oct. 29, 1974

[54] DIGITAL MODULATE/DEMODULATE SYSTEM

[75] Inventors: Richard H. Rearwin, Concord; Milton A. Crandall, Newton, both of Mass.

[73] Assignee: Microwave Associates, Inc., Burlington, Mass.

[22] Filed: Oct. 12, 1973

[21] Appl. No.: 405,882

[52] U.S. Cl. .................... 332/9 R, 178/66, 325/38, 325/141

[51] Int. Cl. .......................................... H03k 7/02

[58] Field of Search ................. 332/9; 325/38, 141; 178/66

*Primary Examiner*—John Kominski

*Attorney, Agent, or Firm*—Alfred H. Rosen; Frank A. Steinhilper

[57] ABSTRACT

A digital information signal modulating system is disclosed which increases the carrying capacity of a given designator band by approximately 2. The disclosure illustrates how a quadrature phase-shift keyed system having four signal states can be converted to a system having nine signal states.

22 Claims, 17 Drawing Figures

OLD ART (QPSK)

DIGITAL MODULATE/DEMODULATE SYSTEM

BACKGROUND OF THE INVENTION

The transmission of digital-type signals is used to convey information of all types. Voice channels are digitized and, of course, information in digital form is the language of modern electronic computers. The consequent demand for channel width is obvious, and with it there is a continuous need to find ways to use more efficiently the bandwidth that is available. This invention is addressed to making better use of the available frequency spectrum.

Digital signals are a stream or series of "ones" and "zeros," called "bits," and may be represented electrically by the presence respectively, of one or another of two prescribed states (voltage, magnetic, etc.), or by the presence or absence of pulses of prescribed duration. The possible arrangements of "ones" and "zeros" from one digital signal or bit stream to the next depend on the information to be transferred. Typically, therefore, a digital signal or bit stream will appear electrically as a time-sequence of such states or pulses.

For transmission purposes, a basic and preferred modulation method for a digital data channel is phase-shift-keyed modulation. Current technology employs a system known as "Quadrature Phase Shift Keying" (QPSK), according to which, for example, the incoming bit stream is digitally processed into two parallel data waveforms each at one-half of the input bit-rate. These two data waveforms are amplitude-modulated with constant amplitude onto respective carrier waveforms of the same frequency, preferably derived from a common source, with the reference carrier of one data waveform off-set in phase by 90° relative to the reference carrier of the other data waveform. Each reference carrier thereby bears constant-amplitude 2-phase (0°, 180°) modulation, so that subsequent combining of the two modulated reference carriers with a 90° phase difference between them produces 4-phase modulation with 90° between adjacent modulation states. This arrangement permits the use of one-half the bandwidth that would otherwise be required. Such 4-phase modulation can also be achieved with an analog phase shifter (U.S. Pat. No. 3,706,945), or with pulses of F.M. The invention will be disclosed with reference to the specific form of QPSK described above, but without limitation thereto.

Given a communications channel of 40 megacycles/-sec. designator bandwidth, the QPSK system will provide up to about 600 PCM telephone channels within that bandwidth (assuming the U.S. PCM standard of 8-bit sampling, and a sampling rate of 8KC).

GENERAL NATURE OF THE INVENTION

One may achieve a significant reduction in the bandwidth required for transmission of digital waveforms by making use of a technique known as partial-response filtering. In its basic aspects that technique is somewhat reminiscent of an earlier scheme known as "double-dotting" in telegraphy. Briefly, in partial-response filtering according to the present invention, the digital signal is passed through a filter of such narrow bandwidth (with respect to the clock rate of the digital signals being processed) that a bit stream consisting of a continuous train of alternating "ones" and "zeros" does not produce a significant output (corresponding in its effect to the presence of continuous "dots" in the telegraphy case). The absence of output is a unique output state that is interpreted in a modulation/-demodulation system according to the invention as a bit stream consisting of alternating "ones" and "zeros." A bit stream consisting of a continuous train of consecutive digital "one" inputs will produce one unique filter output state, and a bit stream consisting of a continuous train of consecutive digital "zero" inputs will produce still another unique filter output state. The filter can therefore have three output states, one of which will be essentially an "absence of output" state. The output from the filter in response to a two-level input bit stream is a three-level or three-state signal (bit stream) derived from the two-level or two-state input signal. This modulation technique can be extended to "*n*" levels, where "*n*" is an integer greater than two. This three-state (or *n*-state) output may be processed digitally to form a replica of the two-state input.

When the digital bit stream is carried as modulation on a RF carrier, this scheme of 3-level partial-response filtering permits a digital waveform of bit rate F to be passed without significant error through a transmission channel of bandwidth one-half F. Thus, for example, the transmission bandwidth required for a 1.54 Megabit data signal is 1.54/2 MHz, or about 770 KHz.

BRIEF DESCRIPTION OF THE INVENTION

The present invention makes new use of partial response filtering in combination with quadrature phase shift keying, to provide a 9-state signal in a given communication channel, in place of the 4-state signal heretofore available from the QPSK system. The new system, which may be known as "Quadrature Partial Response System" (QPRS), is capable of providing about 1,200 telephone channels in a communications channel having 40 megacycles/sec. designator bandwidth, (assuming the U.S. PCM standard of 8-bit sampling, and a sampling rate of 8KC).

Diagramatically, the 4-state modulated carrier output of a QPSK system is typically represented as four vectors of like amplitude extending from a common center point or origin at 90° angular spacings. One vector pair 180° apart represents two possible states of a first of the data waveforms as modulated onto the carrier waveform, while the other vector pair spaced 90° from the first pair represents two possible states of the second of the data waveforms as modulated onto the carrier waveform with 90° phase off-set relative to the carrier waveform of the first data waveform. The center point (i.e.: zero-amplitude modulation state) has no meaning, so the entire information content is in the four vector positions, each of which represents one of four possible output signal states when the two modulated reference carriers are combined.

In the QPRS system of the present invention, each of the data waveform carriers has three possible modulation states, one of which is the substantial "absence of output" or the zero-amplitude modulation state, which centers itself at the center point of the diagram or at the origin of each data waveform vector pair. Because the zero-amplitude modulation state is a useful signal state for each of the data waveforms, it can be combined with either of the non-zero-amplitude modulation states of the carrier for the other data waveform to produce an additional output state. Therefore, when the two reference carriers, each bearing 3-state modulation, are combined, four more signal states angularly located between the original four QPSK vectors are possible, in addition to the zero-amplitude state. By making the amplitudes of the output signals from the two bi-phase modulators equal, four additional vectors can be angularly (phase) located 45° from each of the adjacent original QPSK vectors, at the output of the QPRS filter and with a magnitude such that these four new signal states do not significantly overlap or interfere with the four original signal states. These, plus the zero-amplitude modulation state provide a total of 9 signal states in the new QPRS system.

The invention can be implemented in systems using other methods of combining amplitude and phase modulation, some of which will be alluded to hereinafter, and all of which will be apparent to those skilled in the art.

BRIEF DESCRIPTION OF THE DRAWINGS

In the prior art illustrated in FIGS. 1–3, the vector diagram in FIG. 1 shows the QPSK scheme. Vectors 1 and 2 represent two phase states, 180° apart, of the modulation of a given carrier (not shown) by a first binary bit stream, or digital waveform (not shown). As FIGS. 2 and 3 show, the phase of the carrier is switched 180° (i.e.: double-phase-shift-keyed (DPSK)) each time the digital waveform goes from a "0" state to a "1" state or vice versa, at times T-1 and T-2. FIG. 2 shows the appearance 18 of the input digital waveform as it changes state, e.g.: from a "1" state to a "0" state, at the output of the usual filtering state or stages used in a DPSK system, the bandwidth of which is sufficiently broad to permit the waveform to execute essentially the total available amplitude swing, thereby causing the carrier to execute a phase change of 180°, during a single clock period, as the vectors 1 and 2 illustrate. A second digital waveform (not shown) is similarly modulated onto a similar carrier which is off-set in phase 90° relative to the carrier of the first digital waveform. The vectors 3 and 4 shown in FIG. 1 represent the two oppositely phased modulation states of the second digital waveform carrier, and are therefore illustrated in phase-quadrature with the modulation vectors 1 and 2 of the carrier for the first digital waveform.

FIG. 1 is a typical 4-state modulation diagram for a QPSK system. The circles 11, 12, 13 and 14 centered around the ends of the modulation vectors 1, 2, 3 and 4 respectively, represent the maximum permissible noise vector amplitude for the signal in each respective state; these circles are sometimes called "noise balls" and they assume that the probability distribution for the noise vector angle is uniform over 0° to 360°. The diagonal lines 15 and 16 crossing at the origin of the state vectors represent the state thresholds of the system. If the noise vector from one state should cross an adjacent threshold into the domain of another state, it would cause errors in the system output. Hence the noise balls represent maximum permissible noise vector amplitude in the system.

Figure 4:
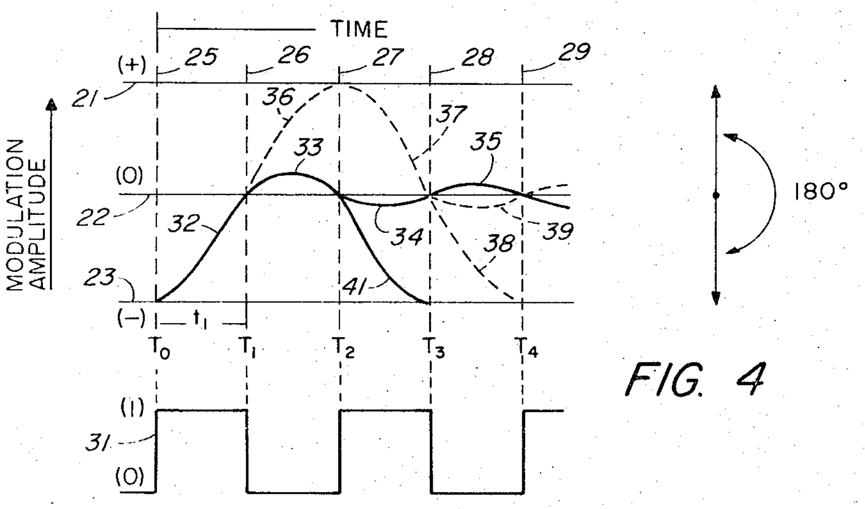
FIG. 4 is a set of waveforms illustrating partial-response filtering, as used in the present invention.

In the present invention, as illustrated in FIGS. 4, 5, 6 and 7, partial response filtering is used to provide a third modulation state on each reference carrier. This embodiment of the invention will be explained with the aid of FIG. 4, which illustrates the principles of partial response. For purposes of this discussion, the diagram in FIG. 4 shows three horizontal lines 21, 22 and 23 which are labelled (+), (0) and (−), respectively, to indicate three different modulation states of a carrier. Line 21 (+) represents full-amplitude modulation of the carrier in one phase state. Line 23 (−) represents full-amplitude modulation of the carrier in the opposite phase state (180°). Line 22 (0) represents substantially zero-amplitude. The total amplitude swing is from (+) to (−). Vertical dashed lines 25, 26, 27, 28 and 29 mark the switch points at times T0, T1, T2, T3 and T4, respectively, along a horizontal time axis, of digital pulses in a digital waveform or binary bit stream 31. The interval $t_1$ between two adjacent switch points is the clock period of the system. Assume that in the waveform 31 under discussion, the state is changing from (−) toward (+) at time T0, and from (+) toward (−) at time T1, etc. This waveform is of the pulse envelope, or nonreturn to zero (NRZ) type. The filter components employed have bandwidth so narrowly constrained that in one clock period $t_1$ the amplitude of the modulation can change only by approximately one-half the total amplitude swing, with the result that the new state of the modulation existing at time T1 is essentially zero amplitude. The portion of the filtered waveform between points 25 and 26, labelled 32, represents a change in the input binary bit stream 31 from a digital (0) to a digital (1).

The NRZ digital waveform 31 may elect one of two possible states at the next switch time T1; that is, it may remain in the same state and be a second digital (1), or it may change to a digital (0), depending on the input information. Consider first the case in which it is changing to a digital (0), as is illustrated in FIG. 4. Bearing in mind that approaching time T1 the input digital waveform being in the digital (1) state was "pushing" the modulation of the carrier toward full amplitude in the (+) state, a reversal in state of the digital waveform to digital (0) at time T1 applies force to reverse the amplitude of the modulation toward the (−) state against the inertia of the specified narrow-band filtering. The result is that at time T2 (i.e.: in one clock period) the modulation amplitude is again substantially zero. The modulation amplitude excursion during the interval from T1 to T2 is represented by the solid-line segment 33. Thus, an alternating series of digital (1)'s and (0)'s in the digital waveform 31 will produce a corresponding sequence of essentially zero-amplitude modulation events along horizontal line 22, as is represented by solid-line segments 34 and 35 of the modulation amplitude curve.

If the state of the digital waveform 31 starting at time T1 were a (1), then the modulation amplitude would continue to shift toward the amplitude represented by line 21 (+), and would arrive at that amplitude (21) at or somewhat earlier than time T2, as is represented by the dashed-line segment 36 of the filtered waveform. The following two dashed-line segments 37, 38 of the filtered waveform represent the case where two digital (1)'s are followed by two digital (0)'s in the digital waveform 31. Thus, if the digital waveform were (1) (1) (0) (0), then the modulation amplitude state would shift from 23(−) to 22(0) to 21(+) to 22(0) to 23(−), following filtered waveform segments 32, 36, 37 and 38, and occupying at each of successive times T0-T4 respectively, one only of three possible states.

The dotted line segment 39 of the filtered waveform shown in the time interval from T3 to T4 represents the case where the fourth digit in the digital waveform 31 is a (1) following a (0), and the filtered waveform segments 32, 36, 37, 39 would represent the digital wave input (1) (1) (0) (1). The segment 41 of the filtered waveform in the time interval from T2 to T3 represents a digital (0) following a digital (0) in the next prior time interval from T1 to T2.

Figure 5:
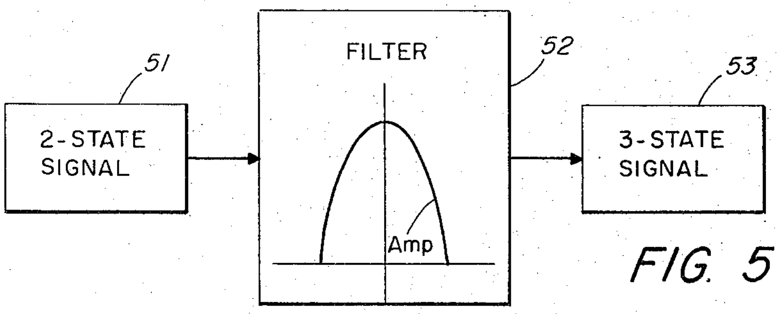
FIG. 5 is a block diagram of a partial-response filtering system for deriving a three-state output from a two-state input signal by a process of double phase shift keying (DPSK)

FIG. 5 shows in block-diagram form the basic functional features of a partial response filtering system for obtaining three data states from a 2-state signal. The data waveform may be a binary bit stream, for example, represented by an input block 51. A bandwidth-limiting filter 52, intervenes between the input block 51 and an output block 53. The output block 53 represents an output signal which can have one of three mutually-exclusive states, for example, voltage amplitudes, which are equally spaced on an arbitrary scale. This signal may be the output of the filter. The time delay, or rate at which this filter responds to a change from one state to the other of the input 2-state signal, is such that output signal from the filter will require two clock periods to swing the full amplitude range, and the amplitude will swing only one-half the full range (approximately) in a single clock period. Thus, in one clock period, it is "forbidden" (i.e.: not possible) to jump over a state of the 3-state output signal.

Figure 6:
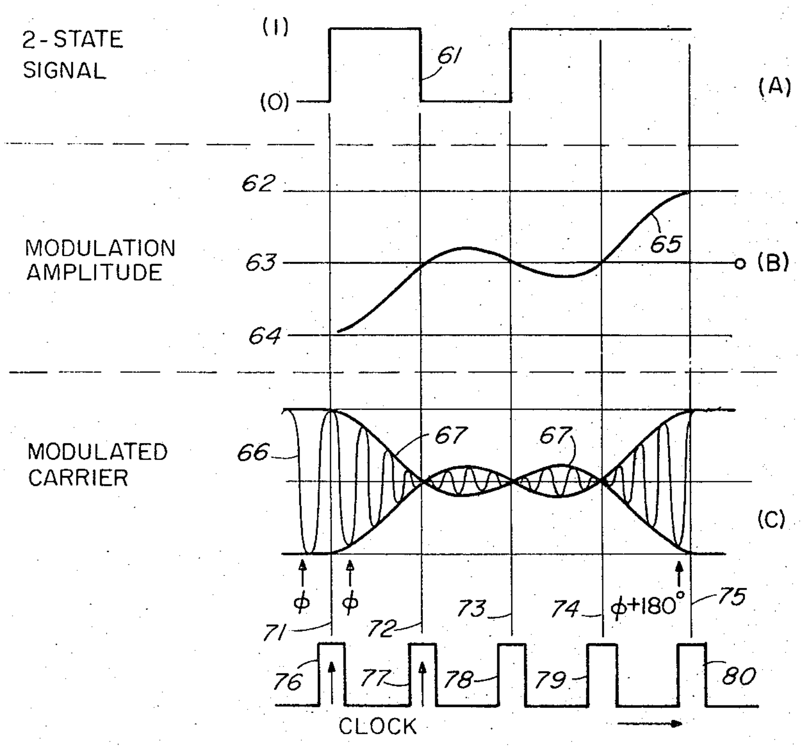
FIG. 6 is a set of graphs illustrating the partial-response filtering system of the invention.

In FIG. 6, the relationship between a two state NRZ signal 61, shown at FIG. 6A, and representing the binary-notation 1,011, and the partial response filtering concepts of the invention are treated in somewhat greater detail than in FIG. 4. The horizontal lines 62, 63 and 64 in FIG. 6B represents three different levels of modulation amplitude at the filter output, and the filtered waveform 65 represents the modulation-amplitude curve centered around the axis 63 of zero-amplitude, or the amplitude at which the phase of the carrier reverses. This much will be recognized from FIG. 4. Vertical lines 71, 72, 73, 74 and 75 are time marks, and a working system will have clock pulses 76–80, respectively, occurring in coincidence with them for sampling the modulated carrier.

Figure 3:
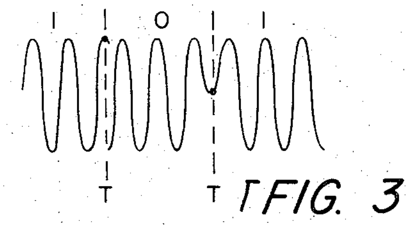
FIG. 3 illustrates phase-reversal of the carrier when the modulating waveform goes from a "one" to a "zero," or vice-versa, in a portion of the QPSK system.

The modulated carrier 66 and its envelope 67, shown in FIG. 6(C), differ in significant respects from the carrier and its envelope in a prior art QPSK system as shown in FIG. 3. In the prior system, when the input 2-state signal changes state, the modulated carrier switches phase 180°, and the modulation amplitude remains essentially level (i.e.: not changed). In the present invention, when the input 2-state (NRZ) signal 61 changes state, for example, from (0) to (1) at time mark 71, the modulated carrier remains in the same phase, and instead its amplitude begins to change, in this case falling off toward zero (assuming that the modulation amplitude at time mark 71 was maximum as shown). With appropriate filter parameters, the modulation amplitude will fall essentially to zero in the interval between two clock pulses 76 and 77. Thus, the clock pulse 77 which coincides with the second time mark 72 enables sampling the event that occurred at the next preceding time mark 71. A sample of the modulated carrier taken at time mark 72 will see essentially zero amplitude with no discernible phase information.

The next input signal event is a change from the (1) to the (0) state of the 2-state input signal 61, occurring at time mark 72. A sample of the modulated carrier taken at time mark 73 under control of clock pulse 78 will again be zero amplitude with no discernible phase information. The next input signal event being a change from the (0) to the (1) state at time mark 73, the sample of modulated carrier taken at time mark 74 again shows zero amplitude and no discernible phase information. What happens between the clock pulses is not sampled and is therefore of no interest to the system, except as noise to the extent the clock pulses are imprecise in width or in location with respect to time. Thus, a repeated series of alternating (1) and (0) states of the input digital waveform will yield a continuous series of zero-amplitude no-phase-information samples of the modulated carrier. In the case of a suppressed carrier, this is in effect the absence of an output signal.

The final event illustrated in FIG. 6, occurring at time mark 74, is a repeat of the (1) state, and the consequence is a growth in amplitude of the carrier modulation from zero to full amplitude, with the phase state characteristic of the (1) state. This is detected upon sampling at time mark 75 under time-control of clock-pulse 80, where the phase of the modulated carrier is 180° different from the phase at time mark 71.

Figure 1:
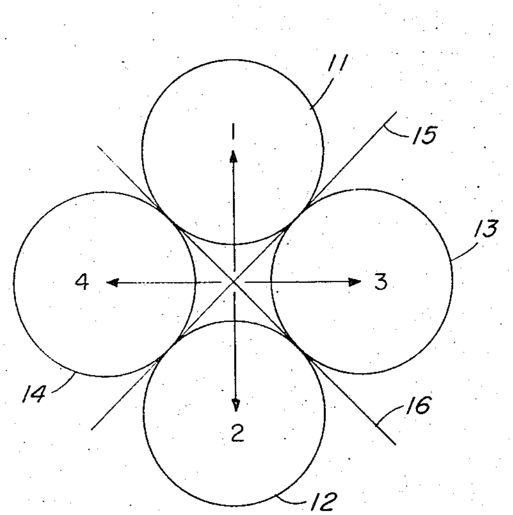
FIG. 1 is a vector diagram illustrating the 4-state signal of the prior-art QPSK system.
Figure 2:
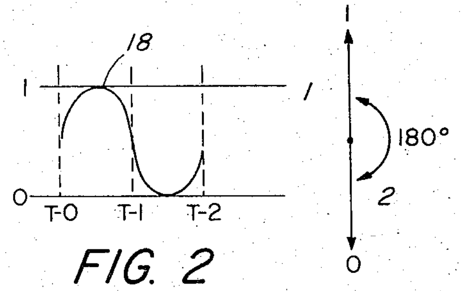
FIG. 2 graphically illustrates the derivation of a pair of vectors 180° apart in the QPSK system.
Figure 7:
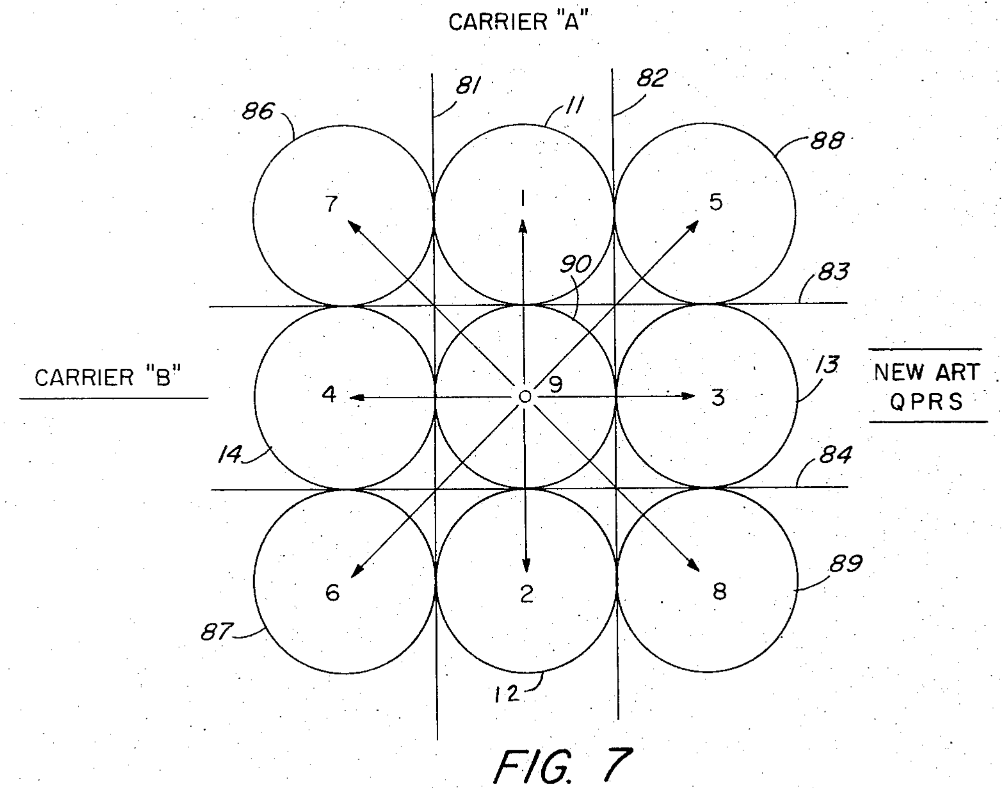
FIG. 7 is a vector diagram illustrating the 9-state signal of the (QPRS) system of the present invention.

FIG. 7 diagramatically illustrates the results of applying partial response keying to a QPSK system, according to the invention. The full array of nine modulation states can be achieved, for example, by DPSK modulating a first carrier (A) with the data stream for one channel, DPSK-modulating a second carrier (b), of like carrier frequency but off-set 90° in phase relative to the first carrier, with the data stream for the second channel, and combining the two modulated carriers prior to the partial-response filter, which may be common to both channels as is illustrated in and will be described with reference to FIG. 8. Briefly, a QPSK modulated carrier is applied to the input of the partial response filter, and in the output there are three modulation states for each channel, as FIG. 7 illustrates, resulting in nine modulation states of the waveform that appears at the filter output. The first channel (carrier "A") can occupy one of three states, denominated 1, 2 and 9, where states 1 and 2 are full-amplitude modulation states 180° apart, as in FIG. 1, and state 9 is the zero-amplitude state. The second channel (carrier "B") has three possible states denominated 3, 4 and 9, where states 3 and 4 are full-amplitude modulation states 180° apart, as in FIG. 1, and state 9 is again the zero-amplitude state. If either carrier is in modulation state 9 (equivalent to only one carrier present at a given time) the three states of the other carrier are possible. Thus, if Carrier B is in state 9, Carrier A can be in state 1, 2 or 9; if Carrier A is in state 9, Carrier B can be in state 3, 4 or 9. If both carriers are present simultaneously, then the process of vector summation will result in four additional modulation states, represented by vectors 5, 6, 7 and 8. For example, if Carrier A with modulation to full amplitude at 180° as represented by vector 1 (see FIGS. 1 and 2) is present, along with Carrier B with modulation to full amplitude at the phase angle represented by vector 4, then their vector resultant causes modulation state 7 to exist at that moment in time. Similarly, modulation states 5, 6 and 8 are created when carriers A and B are phased so as to create simultaneously vectors 1 and 3, 2 and 4, or 2 and 3, respectively. Modulation state 9 is created when both carriers simultaneously are in the zero-amplitude state and therefore (being suppresed) effectively disappear.

Lines 81, 82, 83 and 84 represent the state thresholds of the system, separating the "noise balls" 11, 12, 13, 14, 86, 87, 88, 89 and 90 of the nine respective states. The configuration of the state threshold lines is similar to a tic-tac-toe diagram, and the diagram of FIG. 7 is sometimes given that name.

Figure 8:
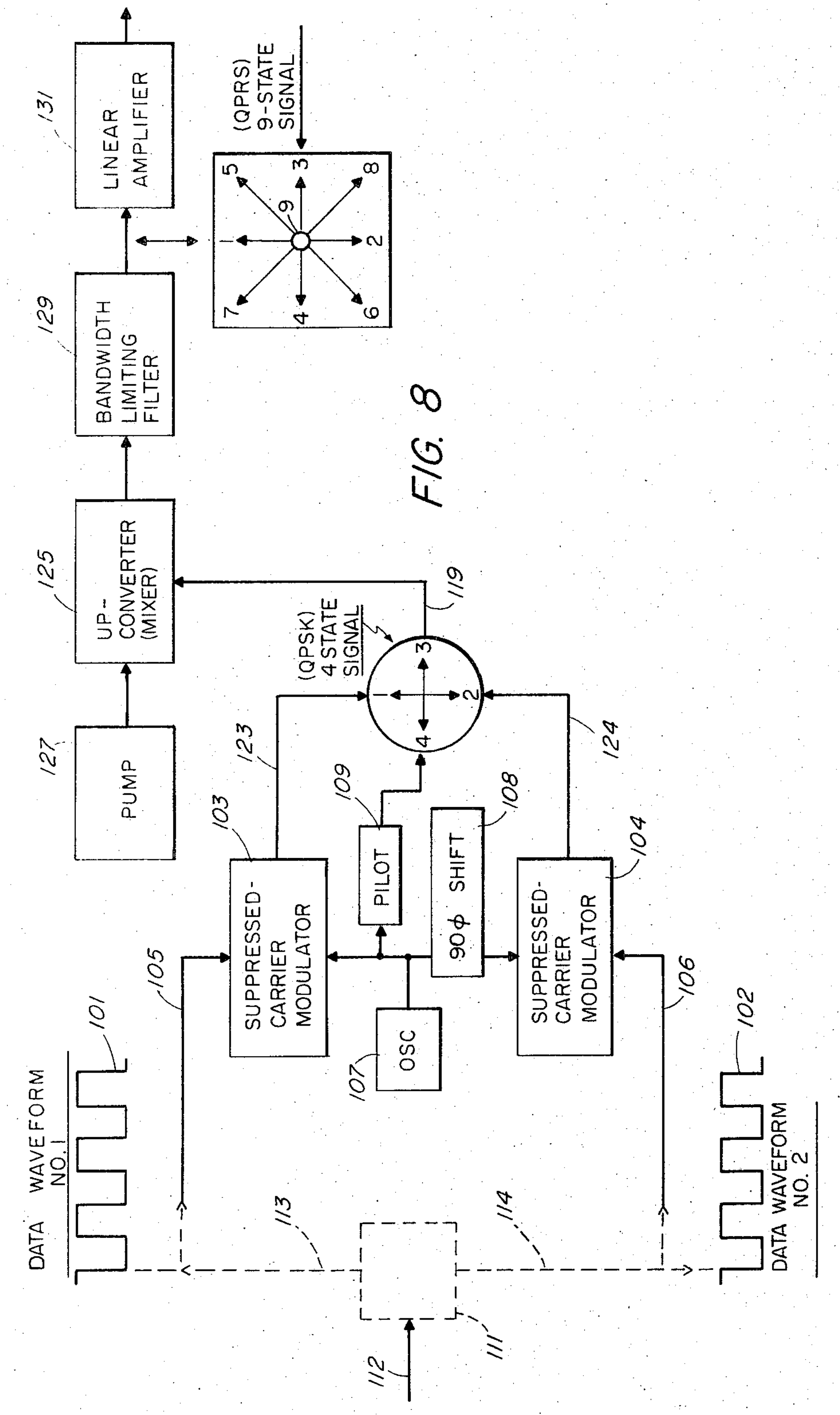
FIG. 8 is a schematic diagram of a quadrature partial response modulation system.

FIG. 8 is a simplified block diagram of a quadrature partial-response modulation system (QPRS) according to the invention. As in the QPSK system, there are two incoming digital data streams 101 and 102 derived in known fashion from a splitting circuit 111 which alternates the incoming bits of the input data stream at the input 112 between two outputs 113 and 114 respectively. As a consequence, each data waveform 101, 102 has different data from the other, and each has a data stream at one-half the input clock rate. These data streams are fed to respective suppressed-carrier modulators 103 and 104, over respective input lines 105 and 106. A common local oscillator 107 feeds both modulators, its signal being shifted 90° at 108 on the way to the second modulator 104. An attenuated version of the oscillator output may be provided as a reference or pilot signal 109, to aid in carrier recovery in the demodulation process (other methods of carrier recovery, not requiring a pilot signal, are possible). The pilot signal is combined with the modulated signal from the first modulator 103. In known fashion, the outputs 123, 124 of the modulators are combined (e.g.: resistively) and a 4-state (QPSK) signal with the pilot signal (if it is present) is provided at the common output 119 of the modulators. This combined signal is fed to a mixer 125, here illustrated in the form of an up-converter. The up-converter, while not required in practicing the invention, is useful in changing the output frequency of the system, by varying a single parameter, and, when used, is supplied with a source 127 of pump energy, the frequency of which can be changed. The output of the up-converter, which will then be in a desired (suppressed) carrier frequency range, is fed to a bandwidth limiting filter 129 (corresponding to the filter 52 in FIG. 5), the output of which is fed to a linear amplifier 131. This combination is suitable to provide the QPRS 9-state output signal according to the invention. It will be appreciated that the mixer 125 could be a down-converter.

As is seen in FIG. 8, partial response filtering according to the invention may be applied to the combined output of a QPSK system. While one might use a separate bandwidth limiting filter in the output line 123 or 124 of each modulator, as is suggested in the illustration of FIG. 5, that is not necessary. A single bandwidth limiting filter 129 can be used, following the combination of the two input bit streams 101 and 102 into a 4-state QPSK signal. However, the need for accurate control of amplitude response to the 9-state (QPRS) signal makes it highly desirable to employ the linear amplifier following the bandwidth-limiting (partial response) filter, and this in turn places a practical restraint on the output power of the amplifier. For high power requirements, an alternative arrangement illustrated in FIG. 9 is preferable.

Figure 9:
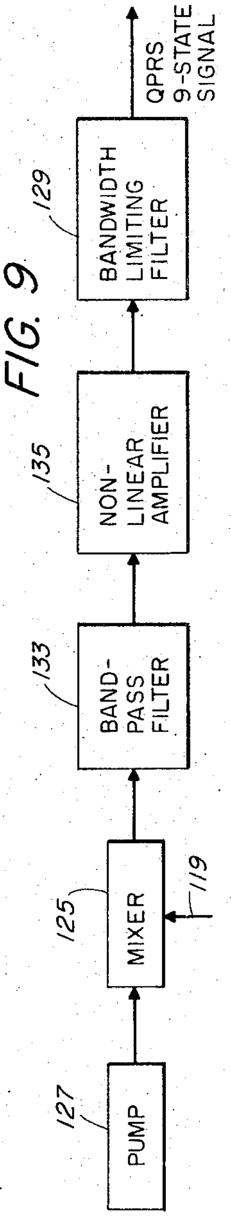
FIG. 9 is a modification of FIG. 8.

FIG. 9 is a modification of that part of FIG. 8 following the 4-state signal output line 119, which is the input to the mixer 125. Parts which are the same as in FIG. 8 bear the same reference characters. A band-pass filter 133 follows the mixer, the purpose of which is to eliminate undesired mixing image signals. This filter is followed by a non-linear amplifier 135, the output power of which is not inhibited by any requirement of linearity. The output of this amplifier is fed to the input of the partial-response filter 129, to produce the 9-state (QPRS) signal of the invention.

The embodiments of the invention, shown in FIGS. 8 and 9 can be used in the modulator portion of a modem, or in the transmitter portion of a digital radio relay link, as examples. The oscillator 107 may function as a local oscillator. As a modem, the invention makes practical the transmission of a T1 data stream (24 channels) over a video (television) channel, as is described below and illustrated in FIGS. 11A and 11B. As a radio relay link, for example in a microwave relay system, it makes possible transmission of approximately twice the number of PCM telephone channels over a given allocated frequency band (1200 vs 600 PCM channels, as is mentioned above). In the radio transmitter environment, it is useful to treat the 4-state signal as a modulated IF signal (e.g.: at 70 mc or 560 mc) and to locate the system carrier frequency optionally in one of several allocated operating bands (ranging between 1Gc and 40Gc). The up-converter mixer 125 is useful in this connection.

With both QPSK and QPRS modulation, the lowest detection threshold for demodulation at the receiver end of a relay link is obtained by coherently demodulating the received signal with a carrier reference signal.

Figure 10:
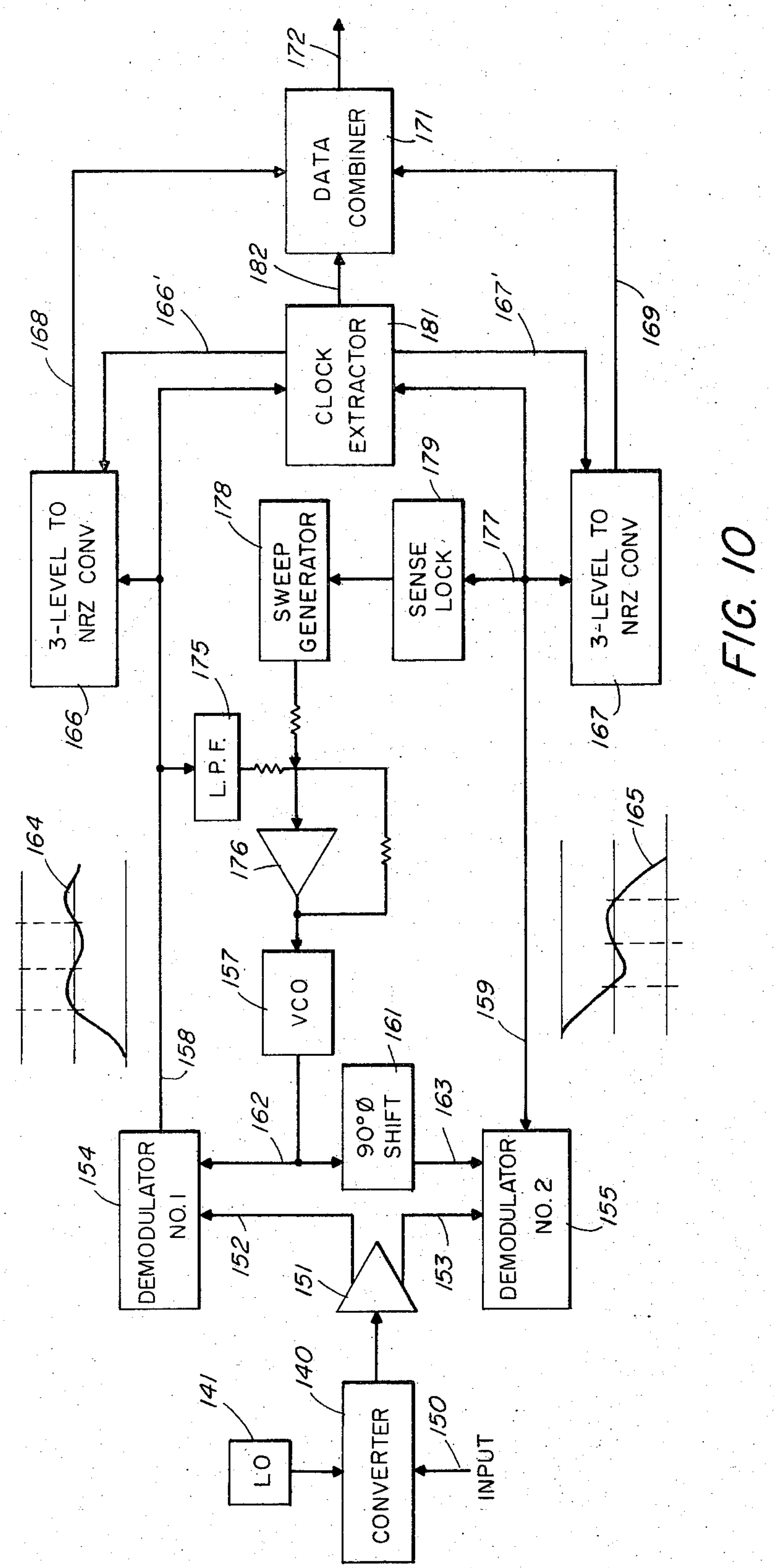
FIG. 10 is a schematic diagram of a demodulator system.

FIG. 10 illustrates a demodulator system for the 9-state signal of the invention. Input 150 for this signal is fed via a converter 140 (up, or down, as desired), and having a L.O. 141, at fixed nominal frequency, to an amplifier 151 having two identical outputs 152 and 153, respectively, and thence to first and second preferably identical balanced demodulators 154 and 155. A voltage controlled oscillator (VCO) 157 which is at the same frequency as the (suppressed) carrier of the received 9-state signal entering the demodulators is coupled over lines 162 and 163 as drive to each demodulator. The phase of the VCO is controlled (as is described below) such that the outputs from the demodulators on lines 158 and 159, respectively, correspond to the three-state equivalent of the input waveforms 101 and 102 respectively, at the modulator end of the system. The quadrature relationship between the two outputs is maintained by providing a 90° phase-shift 161 of the VCO output on line 163 to the second demodulator 155. The output from each demodulator 154, 155 is a 3-level signal represented schematically at 164, 165, respectively, each of which is applied to a respective 3-level-to-NRZ converter 166, 167, for conversion to a 2-state signal that is a replica of the original 2-state signal 101 or 102, respectively. As will be explained below, each converter 166, 167 is independently clocked at a half-clock rate, corresponding to the half-clock rate of the original 2-state signals. The outputs of the converters are applied over lines 168, 169, respectively, to a data combiner 171, to form the full clock rate data waveform, available at its output 172, which is a replica of the full clock rate waveform at the input 112 to the modulator as shown in FIG. 8.

It will be remembered that the pilot 109 was injected in the data modulator (FIG. 8) with no phase shift, so that the pilot is in-phase with the carrier for the first waveform 101 (prior to modulation). Since the modulation in the two channels 123, 124 is essentially suppressed carrier, any DC output from the first demodulator 154 is then representative of the phase error between the received pilot and the VCO 157. This DC error voltage is used to control the VCO frequency so as to reduce the VCO/pilot phase error to a small value. To accomplish this, a low-pass filter 175 is coupled to the output line 158 from the first demodulator 154, and the DC voltage is filtered in this filter to strip off the first channel information, amplified 176 and then applied to the VCO.

When the demodulator circuit is first activated, the VCO frequency may not be within the phase-locked loop capture range of the received pilot 109. A sweep voltage generator 178 is provided to sweep the VCO frequency through all of the possible input frequencies. When a phase-lock is achieved, the first channel demodulator 154 output DC voltage is driven to a null, and the second channel demodulator 155/pilot DC output voltage is maximized. The appearance of the second channel demodulator DC output voltage indicates the existence of the phase-locked condition for the VCO 157. This voltage is sent to over a line 177 from line 159 to a sense-lock circuit 179, which stops the sweep voltage generator 178. Should the phase-locked condition of the VCO be lost, the second channel demodulator 155 DC voltage disappears and the sense lock circuit initiates the VCO sweep again. When no phase-locked condition exists, the sense-lock circuit 179 may also generate a phase-locked loop alarm.

The 3-level output 164, 165 of each demodulator is fed also to a clock extractor circuit 181, over the demodulator output lines 158 and 159. As will be described in greater detail below, the clock extractor circuit phase-locks its own separate voltage-controlled oscillator running at one-half clock frequency to the transitions that occur in the respective three-level outputs 164 and 165. A pulse is generated for each discerned transition in these outputs, and then this oscillator is phase-locked to the resultant pulse streams, to provide a locally generated clock which is applied over line 182 to the data combiner 171, and over lines 166′ and 177′ to the respective converters 166 and 167, and elsewhere as required in the demodulator system. Assuming that the time delay of the bandwidth limiting filter 129 is correctly regulated, and the sample-and-hold properties of the modulator and demodulator circuits are sufficiently precise, then the various states of the 9-state (QPRS) signal will be able to be sampled at each of the 9 points of the tic-tac-toe diagram in FIG. 7, and the clock (76–80 in FIG. 6) will be recoverable independently in the clock extractor 181.

The balanced demodulators 154, 155 may be realized in the form of phase detectors which, being well-known, are not further illustrated.

Figure 12A:
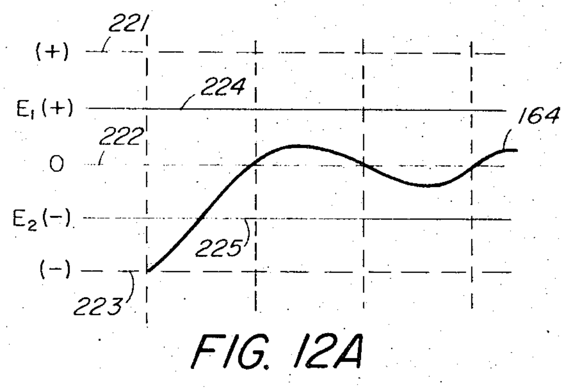
FIGS. 12A and B illustrate the function and basic structure of 3-level to NRZ Converters, shown in FIG. 10.

A 3-level-to-NRZ converter 166 is now described with reference to FIG. 12A and B. The 3-level output signal 164 from the first demodulator 154 is, for illustration purposes, shown as similar to the filtered waveform 32, 33, 34, 35 in FIG. 4. Horizontal dashed lines 221(+), 222(0) and 223(−) in FIG. 12A correspond to the lines 21(+), 22(0) and 23(−), respectively, in FIG. 4, representing the three possible levels of the signal 164. The intermediate state line 222(0) represents the average value of this signal; for purposes of this discussion it will be assumed to be at a nominal "zero" voltage. A positive reference voltage $E_1$ is represnted by a solid line 224 located between lines 221(+) and 222(0), and a negative reference voltage $E_2$ is represented by a solid line 225 located between lines 222(0) and 223(−).

Figure 12B:
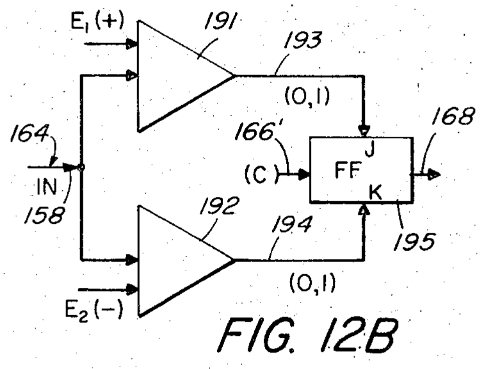

FIG. 12B schematically shows a slicer circuit comprised of two differential amplifiers, or comparators, 191, 192 respectively. The positive reference voltage $E_1$ is applied to one of the two inputs of the first amplifier 191, which may be called the "positive comparator." The negative reference voltage $E_2$ is applied to one of the two inputs of the second amplifier 192, which may be called the "negative comparator." The 3-level output signal 164 is applied in parallel to the remaining inputs of both comparators. As is well-known, a differential amplifier has an output that will be in one of two voltage states depending on the relative status of the two voltages applied to its inputs. The output of each amplifier or comparator may thus represent alternatively a digital (0) or a digital (1), and this is indicated in FIG. 12B at the outputs 193, 194, respectively. The outputs 193, 194 are coupled, respectively, to the "J" and "K" inputs of a J-K Flip-Flop 195, and the "C" input of this flip-flop is clocked. This technique is used in each of the 3-level to NRZ converters 166 and 167. The J-K flip-flop being well-known and commercially available, it is not necessary to illustrate it.

The output of each demodulator 154, 155 is thus a threelevel waveform which is sliced at (essentially) one-fourth and three-fourths of its peak-to-peak value using a synchronized "clock" signal to sample the waveform at the center of each bit interval, thus reducing the likelihood of noise impulses causing transmission errors. Two binary "slicers" determine at the sampling moment, whether the signal is in the central or zero-crossing region, or whether it is outside the center region in either the positive (upper slicer) or negative (lower slicer) region. When the signal is in the positive region, the "upper slicer" 191 will have an output pulse. When the signal is in the center or the negative region, the "upper slicer" will have no output pulse. When the signal is in the negative region, the "lower slicer" 192 will have an output pulse. When the signal is in the center or positive region, the "lower slicer" will have no output pulse. The output (as shown in FIG. 12B) of each slicer is fed to the J-K flip-flop 195 along with a "clock" signal on line 166'. The "upper slicer" output is fed to the J-input and the "lower slicer" output is fed to the K-input. The output of the J-K flip-flop will be the NRZ data stream decoded from the sliced outputs; in the illustration this is Data Waveform No. 1, but Data Waveform No. 2 is similarly recovered.

The J-K flip-flop obeys the following laws and cannot change state except during the instant the clock input abruptly changes from a positive to a negative going transition.

1. If J and K inputs are both "O" prior to the arrival of the clock pulse, then the FF will change to the other state coincident with the arrival of the clock pulse.

2. If J and K inputs are both "1" prior to the arrival of the clock pulse, then the FF will not change state. The state of the FF after the arrival of the clock pulse will be exactly the same as it was prior to the arrival of the clock pulse.

3. If J is "1" and K is "0" prior to the arrival of the clock pulse, then the FF will change to the "1" state coincident with the arrival of the clock pulse (or remain in the "1" state).

4. If J is "0" and K is "1" prior to the arrival of the clock pulse, then the FF will change to the "O" state coincident with the arrival of the clock pulse (or remain in the "O" state).

It is apparent, then, that the state of the Flip-Flop 195 after the arrival of a clock pulse is completely specified by the levels applied to J and K when the clock pulse arrives.

Clock extraction in the receiver takes advantage of the fact that the detected modulation voltages 164, 165, cross their respective average values at precisely the clock interval. This is true even in the case where the reference carrier (162 or 163) for the coherent demodulators 154, 155 is not yet locked to the incoming pilot signal (assuming there is one), since the two channels share a common clock.

Figure 13:
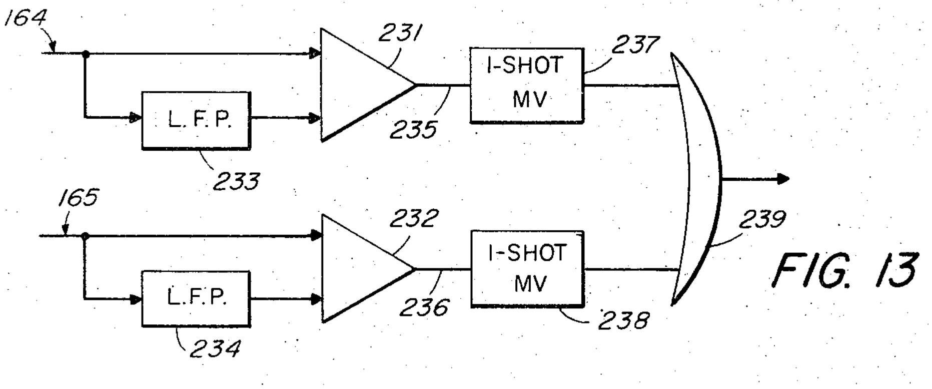
FIG. 13 illustrates schematically the basic structure of a clock extractor, shown in FIG. 10.

The analog baseband voltages 164, 165 representing the data waveform 101 and 102, respectively, are applied to two differential amplifiers or comparators 231, 232, respectively, as is shown schematically in FIG. 13. One input of each comparator is the long-term average voltage of the baseband channel, which is generated by passing the baseband signal 164, 165 through an RC low-pass filter 233, 234, respectively, of small bandwidth. The other input of each comparator has as its input the respective detected baseband signal. The output 235, 236, respectively, of each comparator is a logic level (0) or (1) with transitions occurring precisely when the baseband input crosses its average value, for example, line 222 (0) in FIG. 12A.

These two outputs are coupled to respective 1-shot multivibrators 237, 238, the outputs of which are coupled to an "or gate" 239. The output of the "or gate" is a pulse for each average, or "zero" crossing of either 3-level waveform 164 or 165. These pulses are used to injection lock a local clock oscillator (not shown). In practice, the pulse length is conveniently adjusted to equal one-half of a cycle at the clock frequency. The spectrum of such a pulse train contains a strong discrete component at the clock frequency of the incoming data, as well as a noise background reflecting the random nature of the data input. This signal is used as the reference input to a phase detector (not shown) whose other input is the output of a crystal-controlled voltage-tuneable (local clock) oscillator. The phase detector output is filtered and amplified, then applied to the tuning input of the crystal oscillator such that the oscillator becomes locked in phase to the transitions of the data input. This oscillator output is the clock signal used to synchronize the data demodulation process. The phase detector, filter, amplifier, and oscillator comprise a phase-locked loop of conventional construction.

Figures 14, 15:
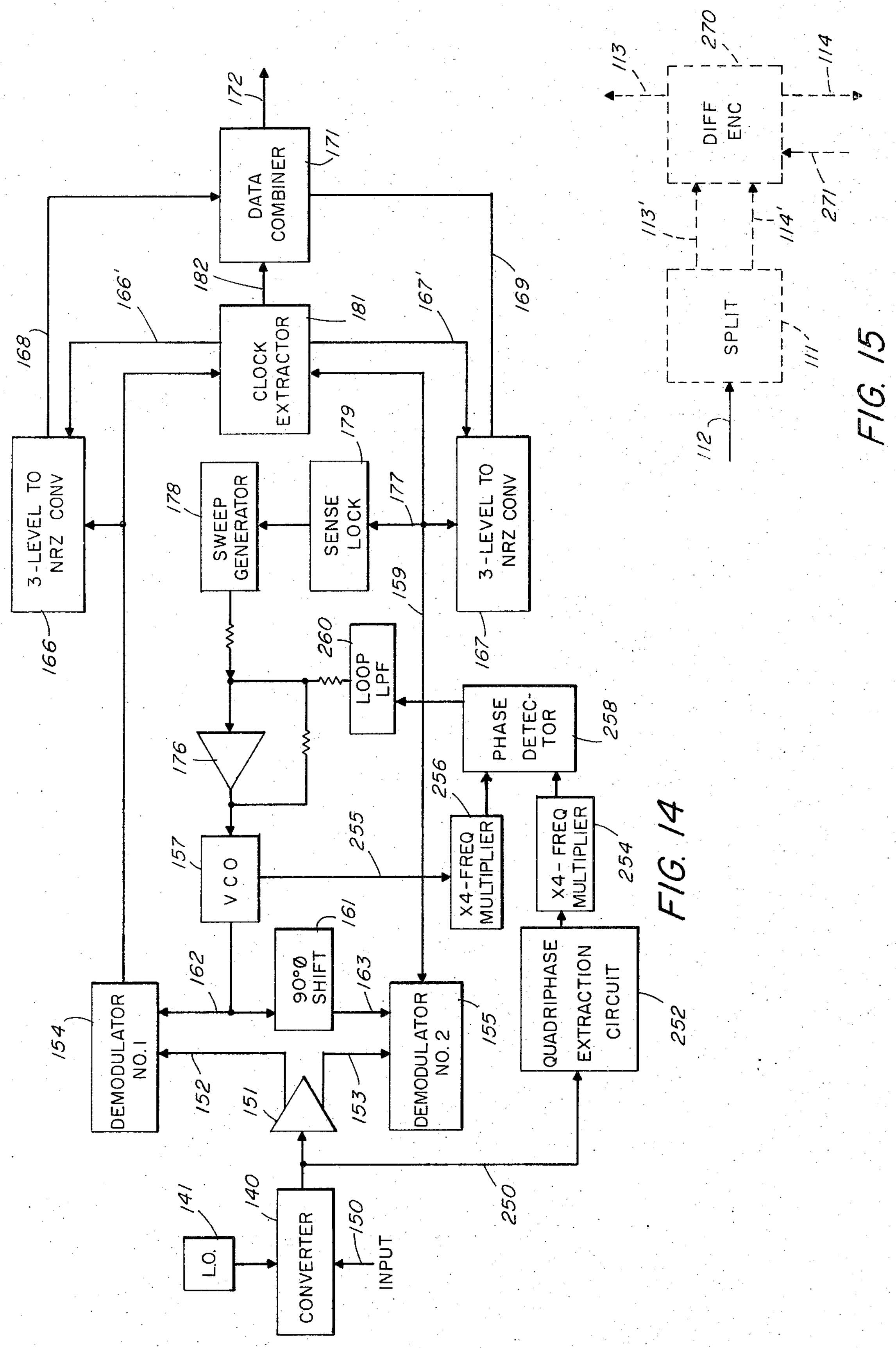
FIG. 14 is a block-schematic diagram of another demodulator system.
FIG. 15 illustrates a prior-art technique of differential encoding.

A customary practice in QPSK transmitter systems, particularly systems employing the NRZ code format, is to scramble the signals in both channels (commonly called the "In-Phase" (I-input) and the "Quadrature" (Q-input) according to a pseudo-random coding scheme, in order to prevent the input to the modulator from being an extensive train of all "1's" or all "0's," even if the actual input assumes either of these two conditions. It is desirable to provide transitions in the transmitted data so that the detection threshold of the receiver demodulator is not compromised. This facilitates recovery of the synchronizing clock signal. The techniques of pseudo-random encoding are known in the art, and are therefore not illustrated or described. The same technique may be used in practice in the QPRS system herein disclosed. FIG. 14 illustrates a demodulator, preferable for use as the receiver portion of a digital radio system, employing an alternate method of carrier recovery which eliminates the need of an injected pilot (e.g.: 109 in FIG. 8) in the transmitted signal. Parts that are common with FIG. 10 bear the same reference characters. As in FIG. 10, the amplified received I.F. signal is applied (152, 153) to a pair of balanced demodulators 154, 155 driven by a coherent IF reference oscillator, the VCO 157. A phase shift of 90° (161) is inserted in one of the coherent reference lines 163 so that the coherent reference is applied to the two balanced demodulators in quadrature. To achieve demodulation without the aid of a carrier pilot, the coherent reference frequency is phase-locked to the carrier frequency in the received waveform by means of circuit components now to be described.

A sample of the received IF signal taken from the converter 140 over line 250 is applied to a quadriphase extraction circuit 252 which samples the received IF waveform in a manner such that pulses in 90° phase increments appear at its output. The quadriphase extraction circuit is operated as a reverse-limiter, or a noise suppressor circuit, which limits the low-amplitude noise but passes the signal which is above the noise threshold. Referring to FIG. 8, particularly the diagram illustrating the QPRS 9-state signal, if the threshold of the noise suppressor circuit is set above the amplitude of the shorter vectors 1, 2, 3 and 4, but below that of the longer vectors 5, 6, 7 and 8, then the output of the extraction circuit 252 will be four bursts or pulses each spaced 90° from its neighbors. This output is coupled to a times-four frequency multiplier 254 which converts the phase increments into multiples of 360°. Since all of the pulses from the extraction circuit are now effectively in phase at the output of this multiplier 254, this latter waveform must contain the received carrier multiplied in frequency by 4.

To phase-lock the coherent reference VCO 157, a sample of the VCO output is applied over line 255 to another times-four frequency multiplier 256, where it also is multiplied by 4. The outputs of both frequency multipliers are applied to a phase detector 258 forming part of a phase-locked-loop consisting basically of the VCO 157, phase detector 258, and a low-pass filter 260. Error pulses will appear in the phase detector output responsive to phase-differences in the pulses applied to it from the multipliers 254, 256, and these error pulses are amplified (not shown) and smoothed in the filter 260 before being applied to the VCO 157. The VCO frequency is then driven in a direction that reduces the phase difference or error to a negligible amount, thereby to phase-lock the VCO output to the received carrier. While this system is more complex than that which is used to recover the carrier in QPSK systems, it can be used in those systems, as well as in the QPRS systems of the invention. Since the output of the coherent reference oscillator 157 is frequency-multiplied by 4, the oscillator phase can lock up in increments of 90°, because this corresponds to 360° increments in the frequency multiplier, and a 4-way phase ambiguity is implicit in the design of the carrier recovery circuits of FIG. 14. In this respect the present system is similar to prior art QPSK systems, and the phase ambiguity is correctable in the same way that it is corrected in those systems, with quadriphase differential encoding and decoding in the transmitter and receiver (modulator and demodulator) sections, respectively. As is indicated in FIG. 15, which reproduces a portion of the prior-art input to a QPSK modulation system that is illustrated in FIG. 8, a differential encoder 270 is inserted in the lines 113'–113 and 114'–114 from the splitting circuit 111 to the modulators 103, 104. A "clock" input 271 is used to synchronize the encoder to the system clock pulses. Similarly, the NRZ outputs of the two 3-level-to NRZ converters 166, 167 are processed through a differential decoder (not shown) prior to reaching the data combiner 171 in the receiver of FIG. 10 or FIG. 14.

Differential encoding is used in the transmitter to avoid ambiguity in establishing the demodulator reference phase at the far-end receiver. With differential encoding it does not matter which of the four phases of the coherent reference oscillator 157 is used for reference. The input data is sent as a change in phase at each successive clock interval, rather than in the phase then existing. In the receiver the recovered data is the difference between the phase at each successive clock interval and the phase at the clock interval immediately preceding it, rather than in-the-phase data. Thus, if there is an error in the coherent reference oscillator (157) phase, this error is the same for both parts of a phase difference. Once the phase difference is taken at the system output, the coherent reference error is eliminated.

The invention has use, for example, in transmitting digital-type signals in the unused portion of allotted baseband of video channels. Video systems are being required to carry more and more information on subcarriers above the video frequencies. Modems have been devised for the transmission of analog information (e.g.: PAC-4) but the present invention is believed to offer the first practical approach to transmitting pulse code modulated (PCM) signals on a subcarrier above a video or possibly FDM message. The present invention thus makes possible a useful Digital-Above-Video (DAV) system for transmitting and receiving multiplexed data signals in the baseband above a standard video signal. The capacity is variable depending on the available bandwidth and linearity of the associated radio link, and may extend to 3 channels above video. Alternatively, the invention may supply 8 channels in a data-only configuration. Each channel may be, for example, a 1.544 Megabit T1 carrier waveform. The "T1 Data Stream" is a data format for digital signals. It is equivalent to 24 PCM Telephone channels (equivalent to 24 wire-pairs). Each channel is capable of handling either one voice channel, or 56 Kilobits/ sec. of digital data (one bit per sample reserved for signalling). As will now be appreciated, the modulation scheme bears resemblance to the scheme used for chroma modulation in color TV, except that the modulating waveforms are digital in nature.

Figure 11A:
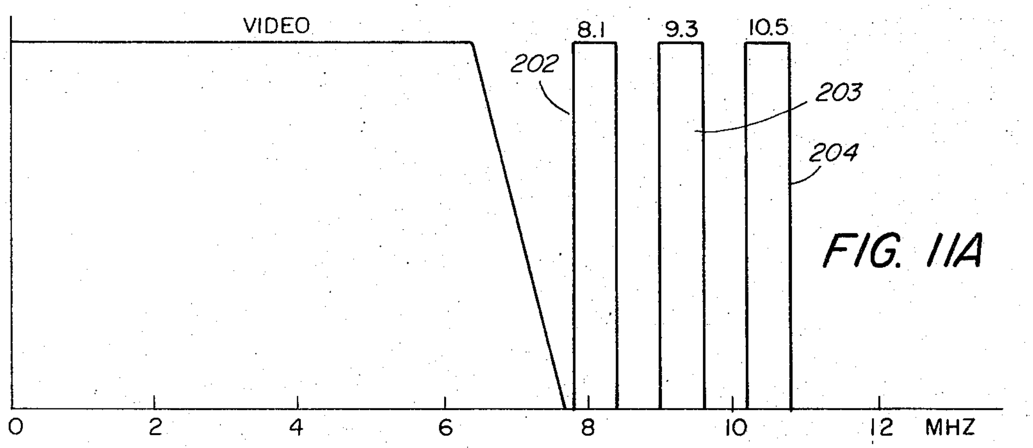
FIGS. 11A and 11B show frequency plans for transmission of digital signals in the video base-bands for transmission of digital signals along with video signals over microwave radio.
Figure 11B:
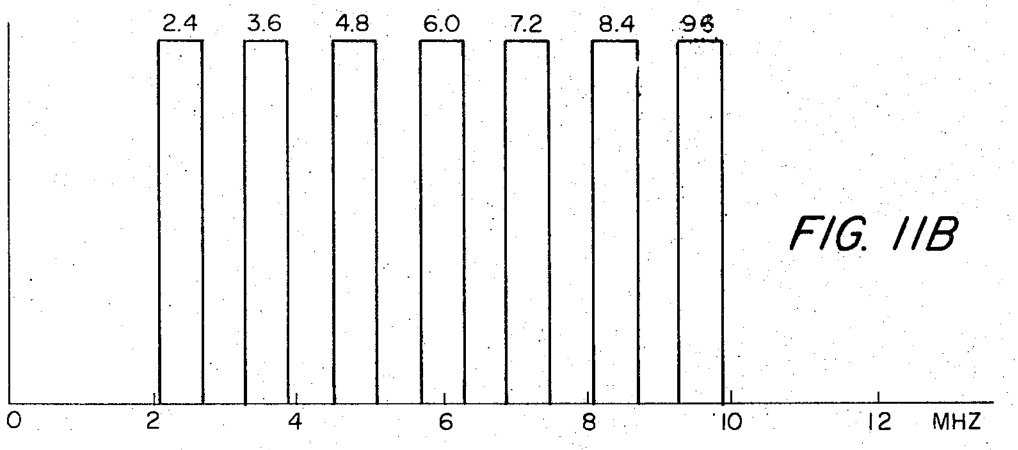

Two sets of frequency plans are shown in FIGS. 11A and 11B. These figures assume 1.2MHz channel spacing. In FIG. 11A, the video band is represented at 201, and three digital data channels 202, 203 and 204 are shown spaced 1.2MHz apart at their centers. In FIG. 11B seven channels are shown in the dataonly case. If 1.1MHz channel spacing is achieved in a given system, there will still be 3 channels above video, but 8 channels will be possible in the data-only system, with a reduction of 200 KHz in over-all bandwidth.

Error detection capability of the invention derives from the availability of forbidden transitions to indicate the presence of error. Simple logic is adequate to detect a jump over a required transition in either signal channel. Thus, if demodulation is being performed without a pilot signal, analog multiplication of the detected three-level signals 164 and 165 will yield a product that has a known value (e.g.: "zero") if no error exists.

As will be readily appreciated, the foregoing illustrations of the invention are exemplary only. A few variations and alternative embodiments have been suggested in the description of the disclosed embodiments, but an exhaustive discussion of additional embodiments and applications of the invention is neither appropriate nor practical in this disclosure. The inventive concept can be used with virtually any digitized signals, to increase the carrying capacity of a given band. It is not limited to using three levels, or states, as has already been mentioned. Thus, one may employ a scheme in which the band-limiting filter components will permit an applied digital signal to drive the filter output only one-fifth of the total possible output swing, thereby providing a 5-level output signal. The apparent constraint on such choices is the rigidity of specifications that one is willing to accept in the design and construction of the system and its components in order to assure error-free communication of the intelligence from one point to another. From the viewpoint of system design, it will be understood that if the system is linear after the IF stages, then band-limiting to generate partial response signals according to the invention can be done at IF rather than at RF. If the suppressed carrier modulators are linear, as well as the following parts of the system, then band-limiting can be done at baseband. As is apparent in connection with FIG. 9, choice in this respect will depend, at least in part, on the output power required.

One may compare the present invention, employing two carriers in quadrature, with a straight phase-shift system, as is shown for example in FIG. 3 of U.S. Pat. No. 3,706,945. The present invention, in its simplest form, as illustrated, approximately doubles the capacity in a QPSK channel. It appears that a straight phase shift system would require 16 phase states to do likewise.

Suppressed-carrier amplitude modulators 103 and 104 may take the well-known form of a balanced modulator. When a carrier is amplitude modulated with a single modulating frequency in a balanced modulator, the resultant wave is composed of the following frequencies:

1. A suppressed-carrier frequency
2. An upper-side frequency which is equal to the carrier plus the modulating frequency
3. A lower-side frequency which is equal to the carrier minus the modulating frequency.

In a balanced modulator, the carrier is introduced in such a way that current at carrier frequency cancels out in the output. Therefore, with no modulation input, there will be no output.

We claim

1. A digital information signal modulating system comprising means to provide a two-state NRZ digital waveform having a known clock period, means to provide a carrierfrequency wave, means to apply said digital waveform to double-phase-shift modulate said carrier wave at a known substantially constant amplitude, means to create a three-state waveform representative of said digital waveform including partial-response filter means having an input and an output, and means to apply said modulated wave to said input, said filter means having a bandwidth so limited that in a time interval equal to one clock period of said digital waveform said modulated wave traversing it cannot swing more than approximately one-half said amplitude as seen at said output.

2. A system according to claim 1 including substantially linear amplifier means coupled to the output of said filter means.

3. A system according to claim 1 including non-linear amplifier means coupled between the output of said carrier frequency means and the input of said filter means.

4. A digital information signal modulating system according to claim 1 including means to provide a second two-state NRZ digital waveform having said known clock period and temporally interleaved with said first-named digital waveform, means to provide a second carrier-frequency wave of like frequency to said first-named carrier-frequency wave and off-set 90° in phase relative thereto, means to apply said second digital waveform to double-phase-shift modulate said second carrier-frequency wave at said known amplitude, means to combine said second modulated wave with said first-named modulated wave, and means to apply said combined modulated waves to said input of said filter means.

5. A system according to claim 4 including substantially linear amplifier means coupled to the output of said filter means.

6. A system according to claim 4 including non-linear amplifier means having an input and an output, means to apply said combined modulated waves to said amplifier input, and means to couple said amplifier output to said input of said filter means.

7. A digital information signal modulating system comprising in combination means providing first and second signals representing respective first and second NRZ digital waveforms each having a known clock period, the first signal modulating a carrier selectively at one or the other of two first phase states 180° apart and the second signal modulating said carrier selectively at one or the other of two second phase states 180° apart and each respectively angularly spaced 90° from one of said first phase states, said carrier having substantially the same amplitude in each of said phase states, and partial-response filter means having an input coupled to receive the modulated carrier signals, said filter means having a bandwidth so limited that in a time interval equal substantially to said clock period a switching of either of said digital waveforms from one of its digital states to the other reduces from full-amplitude substantially to zero in the output of said filter the amplitude of the carrier modulated thereby.

8. A system according to claim 7 including substantially linear amplifier means coupled to the output of said filter.

9. A system according to claim 7 including non-linear amplifier means between said modulated carrier signals and said filter means.

10. An amplitude-modulated phase modulation system comprising a quadrature-phase-shift-keyed (QPSK) system for modulation at a known substantially constant amplitude with a bit stream at a given clock rate split into two parallel data waveforms each at one-half of the input bit-rate, partial-response filter means having an input and an output, and means to apply the output of said QPSK system to said input, said filter means having a bandwidth so limited that in a time interval equal to two clock periods of said input bit stream a modulated wave from said QPSK system cannot swing more than approximately one-half said amplitude as seen at said output.

11. A system according to claim 10 including substantially linear amplifier means coupled to the output of said filter means.

12. A system according to claim 10 including non-linear amplifier means coupled between the output of said QPSK system and the input of said filter means.

13. A 9-state phase-modulated signal on a pair of quadrature-related carrier waves of like frequency in which each of said carrier waves has three mutually-exclusive modulation states one only of which is a substantially zero-amplitude state, the simultaneous occurrence of the zero-amplitude state of both of said carrier waves constituting one of said nine states, the simultaneous occurrence of a non-zero amplitude modulation state of one of said carrier waves with the zero-amplitude state of the other constituting a unique one of said nine states, and the simultaneous occurrence of a non-zero amplitude modulation state of one of said carrier waves with a non-zero amplitude modulation state of the other carrier wave constituting by vector addition another unique one of said nine states.

14. A method of digital pulse-code modulating a carrier wave to produce a 9-state phase-modulated signal, comprising the steps of providing said carrier wave in two components phased substantially 90° apart, providing a bit stream at a known clock rate and splitting said bit stream into two parallel wave-forms each at one-half said clock rate, double-phase-shift modulating each of said components at a known substantially constant amplitude with a unique one of said waveforms, and band-limiting said modulated components so that in a time interval equal substantially to two clock periods a modulated wave cannot swing more than approximately one-half its said amplitude, whereby each modulated carrier wave component can at a given instant occupy one only of first and second states of like amplitude and respective opposite phases and a third state of essentially zero-amplitude, and said components in combination will provide a 9-state signal in which the simultaneous occurrence of the zero-amplitude state of both of said carrier waves constitutes one of said 9 states, the simultaneous occurrence of a non-zero amplitude modulation state of one of said carrier waves with the zero-amplitide state of the other constitutes a unique one of said nine states, and the simultaneous occurrence of a non-zero amplitude modulation state of one of said carrier waves with a non-zero amplitude modulation state of the other carrier wave constitutes by vector addition another unique one of said nine states.

15. A method according to claim 14 in which said modulated carrier wave components are combined and then band limited.

16. A method according to claim 14 in which each of said modulated carrier wave components is separately band-limited, and thereafter they are combined.

17. A method according to claim 14 in which said modulated carrier wave components are combined prior to being band-limited, the combined modulated carrier wave signal is amplified non-linearly, and after amplification said combined signal is band-limited to provide said 9-state signal.

18. A method according to claim 14 in which said 9-state signal is linearly amplified.

19. A digital information signal modulating system comprising means to provide a two-state NRZ digital waveform having a known clock period, means to provide a carrier-frequency wave, means to apply said digital waveform to double-phase-shift modulate said carrier wave at a known substantially constant amplitude, waveform modifying means to create a (2+n)—state waveform representative of said digital waveform, ("n" being an integer), said waveform modifying means including partial-response filter means having an input and an output, and means to apply said modulated wave to said input, said filter means having a bandwidth so limited that in a time interval equal to one clock period of said digital waveform said modulated wave traversing it cannot swing more than approximately one-nth of said amplitude as seen at said output.

20. In a digital information transfer system having means to convert an original two-state digital signal having a known clock rate to a *n*-level signal where "n" is an integer greater than 2, means to transmit the *n*—level signal, means to receive the transmitted *n*-level signal, and *n*-level to 2-level converter means for converting the *n*-level signal to a two-level digital signal the information content of which is a substantial replica of the information content of said original signal, said *n*-level to 2-level converter means comprising, logic means for creating said two-level digital signal in response to sampling of said *n*-level signal at a clock rate corresponding to the clock rate of said original signal, signal input means to said logic means for establishing $n-1$ boundary levels each lying between a pair of adjacent levels in said received *n*-level signal, and clock input means to said logic means for effecting said sampling.

21. A system according to claim 20 in which said means to receive includes clock-pulse generator means responsive to said *n*-level signal for generating a train of clock pulses at a rate corresponding to said known clock rate, said generator means comprising an input for said *n*-level signal, clock oscillator means having a parameter that is variable for controlling the frequency of oscillation, means responsive to crossings of said *n*-level signal over a prescribed level to generate reference signals for said parameter, and means to apply said reference signals to said parameter to adjust the frequency of said oscillator to correspond with the clock frequency of said original digital signal.

22. In a digital information transfer radio link system according to claim 20 employing suppressed carrier modulation without transmitting a pilot signal to enable the receiver means to recover the carrier, carrier recovery means comprising *n*-phase extraction circuit means to sample the received waveform and provide a series of pulse-like waves temporally spaced in phase (360/n) °, local oscillator means controllable in frequency to oscillate in the region including the frequency of the suppressed carrier, means to multiply the frequency of the pulse-like waves by "*n*," means to multiply the frequency of the local oscillator by "*n*," comparator means for comparing the two multiplied signals and generating a control signal for the oscillator means, and means to apply the control signal to adjust the oscillator frequency to the frequency of the suppressed carrier.

* * * * *

PO-1050
(5/69)

UNITED STATES PATENT OFFICE
CERTIFICATE OF CORRECTION

Patent No. 3,845,412 Dated Oct. 29, 1974

Inventor(s) R.H. Rearwin; M.A. Crandall.

It is certified that error appears in the above-identified patent and that said Letters Patent are hereby corrected as shown below:

Column 12, line 25, after "(Q-input)" insert --)--
Column 14, line 30, delete "dataonly" and insert --data-only--
Column 16, line 33, after "for" insert --phase--
Column 18, line 42, delete "(360/n)" and insert --360/n--

Signed and sealed this 10th day of June 1975.

(SEAL)
Attest:

RUTH C. MASON
Attesting Officer

C. MARSHALL DANN
Commissioner of Patents
and Trademarks